United States Patent [19]

Wijn

[11] Patent Number: 4,863,570
[45] Date of Patent: Sep. 5, 1989

[54] PROCESS FOR FRACTIONAL DISTILLATION UNDER VACUUM

[75] Inventor: Enno F. Wijn, Amsterdam, Netherlands

[73] Assignee: Shell Oil Company, Houston, Tex.

[21] Appl. No.: 91,487

[22] Filed: Aug. 31, 1987

Related U.S. Application Data

[60] Continuation of Ser. No. 55,673, May 29, 1987, which is a division of Ser. No. 520,715, Jan. 13, 1984, abandoned.

[30] Foreign Application Priority Data

Feb. 23, 1983 [GB] United Kingdom ............... 8305015

[51] Int. Cl.⁴ .................... B01D 3/10; B01D 3/14
[52] U.S. Cl. ........................... 203/91; 203/89; 203/98; 203/72; 159/13.1; 159/49; 202/177; 202/185.2; 202/205; 202/236
[58] Field of Search ............... 203/89, 72, 73, 99, 203/90, 91, 98, 42; 202/158, 236, 205, 177, 185.1, 173, 172; 159/13.3, 5, 13.1, 49, 46; 261/112; 196/128; 208/360

[56] References Cited

U.S. PATENT DOCUMENTS

| | | | |
|---|---|---|---|
| 2,447,746 | 8/1948 | Ferris et al. | 159/13.3 |
| 2,472,578 | 6/1949 | Ferris et al. | 159/13.3 |
| 2,514,943 | 7/1950 | Ferris et al. | 202/236 |
| 2,514,944 | 7/1950 | Ferris et al. | 159/13.3 |
| 3,444,049 | 5/1969 | Starmer et al. | 202/173 |
| 3,782,703 | 1/1974 | Kolar | 261/112 |
| 4,613,410 | 9/1986 | Rivers | 203/89 |

FOREIGN PATENT DOCUMENTS

066790 12/1982 European Pat. Off. .
1519663 4/1970 Fed. Rep. of Germany .

Primary Examiner—Wilbur Bascomb

[57] ABSTRACT

Process for the fractional distillation of a liquid under vacuum comprising preheating a liquid to be distilled, forming under vacuum the preheated liquid into a first series of thin sheets of falling liquid to be distilled, and a cooling liquid into a second series of thin sheets of falling cooling liquid, the thin sheets of the first series being alternately arranged with the thin sheets of the second series, in close proximity to one another. Part of the liquid to be distilled is vaporized and passed to the thin sheets of cooling liquid to form liquid distillate and separately recovering the liquid distillate with the cooling liquid and the non-vaporized part of the liquid.

6 Claims, 3 Drawing Sheets

PROCESS FOR FRACTIONAL DISTILLATION UNDER VACUUM

This is a continuation of application Ser. No. 055,673, filed May 29, 1987 which is a division of application Ser. No. 570,715 filed Jan. 13, 1984 now abandoned.

BACKGROUND OF THE INVENTION

The present invention relates to a process for fractional distillation under vacuum, and in particular to such a process wherein liquid to be distilled is passed in a relatively thin film through a depressurized vessel. Part of the liquid film is caused to vaporize, the formed vapor is collected on a condensing surface for condensing the vapor to form liquid distillate whereafter the formed liquid distillate and the non-vaporized part of the liquid film, i.e. the residue, are separately recovered from the vessel.

The above type of distillation, which is also called molecular distillation, is particularly suitable for distilling heavy liquids with extremely high boiling points. It is normally conducted at pressures in the range of a few microns Hg absolute, which means a high vacuum compared to distillation in conventional vacuum units operating at a few mm Hg absolute at least. Molecular distillation might therefore advantageously be applied for further distilling residues from conventional high vacuum distillation units. It is known to carry out short path distillation under vacuum by providing a heated vaporizing solid surface and a condensing surface adjacent thereto, and supplying to the vaporizing surface the liquid to be distilled. The condensing surface employed may be a solid surface, suitably cooled, or may comprise films of a condensing liquid. When using such a heated solid surface for vaporization, care should be taken to prevent coke formation on the surface due to decomposition of the liquid on the relatively hot vaporizing surface.

To overcome the problem of coke formation it has also been proposed to heat the liquid to a vaporizing temperature prior to forming the liquid into a vaporizing film flowing along a guiding surface. Special measures should however be taken to insure that the liquid is spread out in a thin film over the evaporating surface, to enable all the volatile components in the liquid to vaporize and leave the remaining liquid. Although coke formation on the non-heated guiding surfaces is considerably reduced compared to the application of heated guiding surfaces, there remains a problem of fouling of the guiding surfaces. This occurs especially when very heavy liquids are to be distilled, the construction of the distillation unit should be such that the unit can be easily and rapidly dismantled for cleaning or replacement of the guiding surfaces.

Although small installations with restricted capacities may be constructed to provide a good accessibility to the internals, problems may occur with large units intended for high liquid throughputs. In the latter case care should be taken that the internals can be easily replaced and that the accessibility of such a unit is not accompanied with an impairment of the evacuability of the unit.

BRIEF DESCRIPTION OF THE INVENTION

The object of the present invention is to provide a process for fractional distillation under vacuum which is characterized in that only a minimum of equipment is required for carrying out the process.

The process of the present invention for fractional distillation of a liquid under vacuum comprises preheating a liquid to be distilled and forming under vacuum the preheated liquid into a first series of thin sheets of falling liquid to be distilled. A cooling liquid is formed into a second series of thin sheets of falling cooling liquid, the thin sheets of the first series being alternately arranged with the thin sheets of the second series, in close proximity to one another. This allows part of the liquid to be distilled to vaporize and to pass to the thin sheets of cooling liquid to form liquid distillate and separately recovering the liquid distillate with the cooling liquid and the non-vaporized part of the liquid.

This process can be carried out with a minimum of equipment, since the evaporator surfaces for the liquid to be distilled and the cooling surfaces for condensing purposes are both merely formed by sheets of liquid. In a suitable embodiment of the process according to the invention part of the recovered cooling liquid with liquid distillate is cooled and recirculated to form the thin sheets of cooling liquid.

The present invention further relates to an apparatus for carrying out the above process which apparatus comprises a normally vertically extending evacuable vessel, inlet means for liquid to be distilled and cooling liquid at the upper part of the vessel and outlet means for residue and cooling liquid with liquid distillate at the lower part of the vessel. The vessel is provided with means for separately distributing the liquid to be distilled and the cooling liquid into two series of thin sheets of falling liquid, wherein the thin sheets of the first series are alternately arranged with the thin of the second series in close proximity to one another. Means are provided for separately collecting the residue and cooling liquid with liquid distillate in the lower part of the vessel.

The distributing means may consist of substantially horizontal, parallel gutters extending over substantially the full cross section of the vessel, wherein the bottoms of these gutters are provided with liquid discharge openings formed by elongated slits or rows of small, for example circular, holes.

In a suitable embodiment of the above apparatus according to the invention redistributing means are provided between the distributing means and liquid collecting means for maintaining proper, thin sheets of liquid to be distilled and thin sheets of cooling liquid throughout the length of the vessel. These redistributing means may be further combined with means for cooling the thin sheets of cooling liquid and/or with means for heating the thin sheets of liquid to be distilled.

BRIEF DESCRIPTION OF DRAWINGS

The invention will now be described in more detail by way of example only, with reference to the appended drawings, in which.

PREFERRED EMBODIMENT

It should be noted that the components of the first shown apparatus may be replaced by one or more of the components of the second shown apparatus without departing from the invention.

Figure 1:
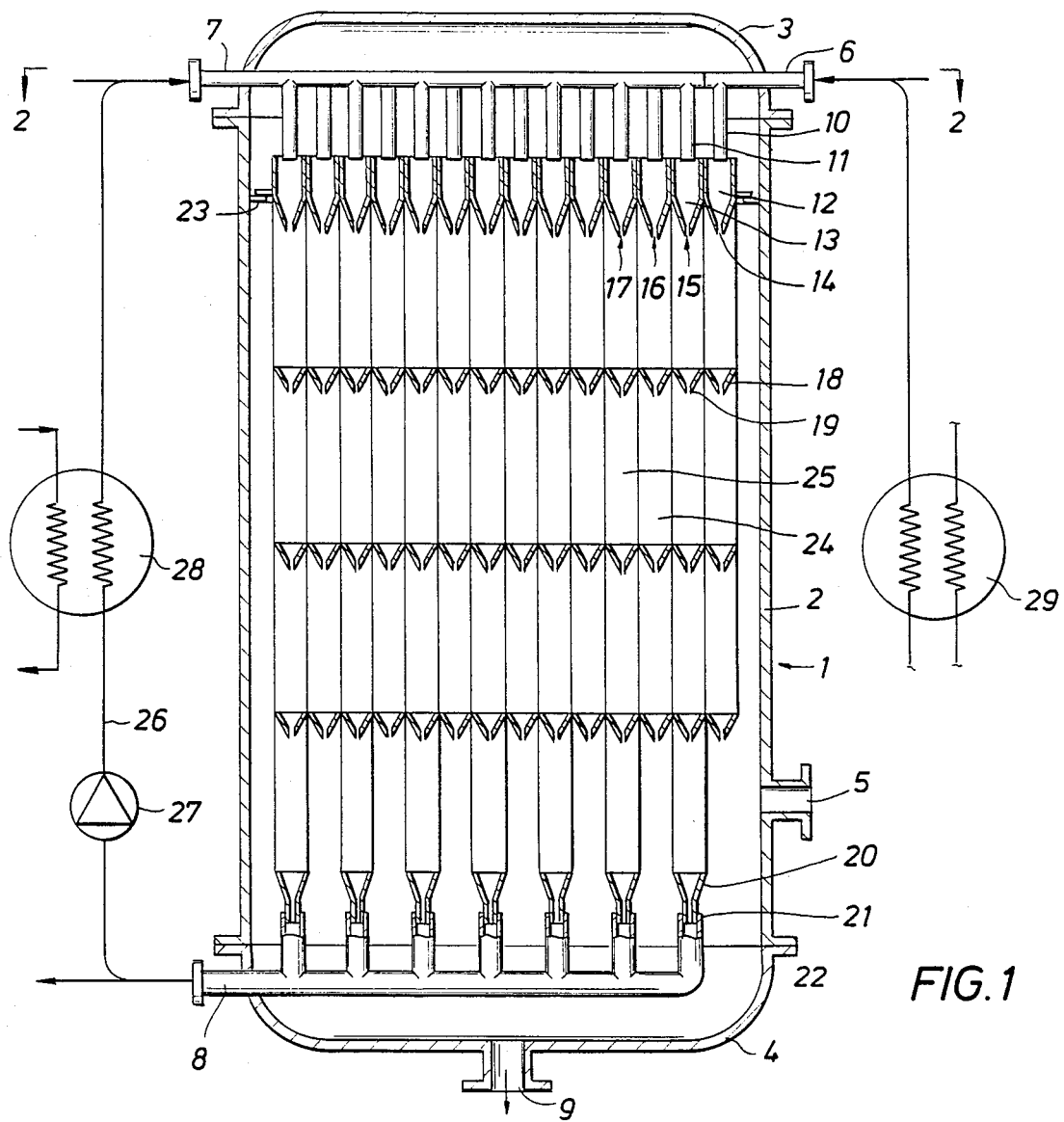
FIG. 1 shows a vertical cross-section of a first apparatus according to the invention.
Figure 2:
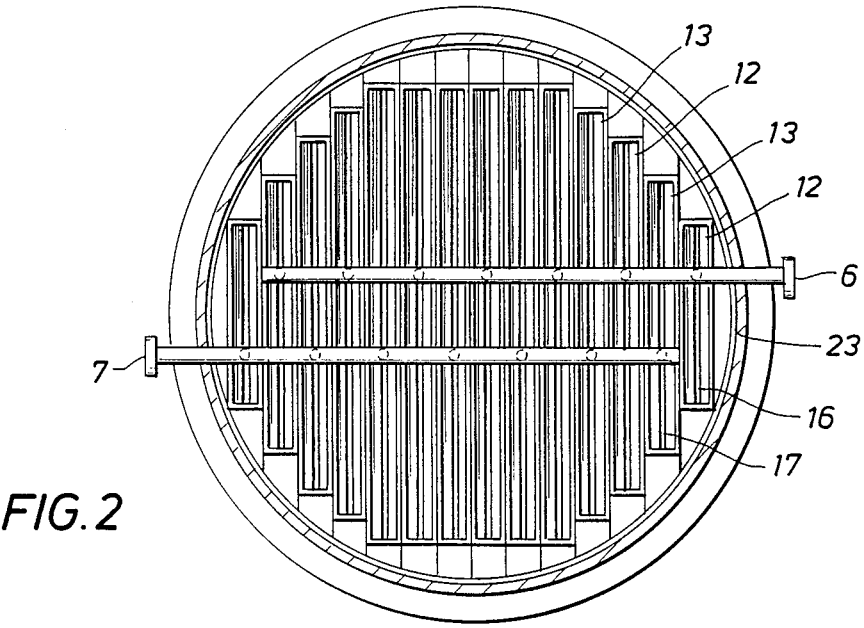
FIG. 2 shows cross-section II—II of the apparatus shown in FIG. 1.

Referring to the FIGS. 1 and 2, reference numeral 1 indicates a vertically extending vessel designed to withstand very low internal pressures. To meet the high strength requirements vessel 1 preferably has a substantially cylindrical side wall 2, a curved top wall 3 and a curved bottom wall 4. As shown in FIG. 1, the curved top wall 3 and the curved bottom wall 4 are detachably secured to the side wall 2 by means of flange connections. For depressurizing the interior of vessel 1, a tubular member 5 is inserted in the wall of said vessel, which member is connected to pumping means, capable of producing a vacuum in the range of 0.001-0.1 mm Hg. The tubular member is suitably arranged near the liquid outlets in the lower part of the vessel. Since such pumping means are known per se and do not form part of the inventive idea itself, they have not been indicated in the drawings.

The upper part of the vessel 1 is provided with an inlet tube 6 for liquid to be distilled and with an inlet tube 7 for cooling liquid. The lower part of the vessel 1 is provided with an outlet tube 8 for cooling liquid with formed distillate and with an outlet tube 9 for residue. The inlet tubes 6 and 7, passing through openings in the curved top wall 3, extend over substantially the full width of the vessel 1 and are provided with discharge pipe openings 10 and 11, respectively in their lower parts for supplying liquid into the vessel. These openings 10 and 11 are aligned with substantially horizontal distributor gutters or channels 12 and 13, respectively, substantially equally divided over the cross-section of the vessel. The gutters 12 and 13 for liquid to be distilled and cooling liquid, respectively, are alternately arranged such that each gutter 12 is positioned adjacent to at least one gutter 13. The gutters 12 and 13 are provided with tapering bottom parts 14 and 15 ending in elongated slits 16 and 17, respectively, for discharging liquid in the form of thin sheets of falling liquid.

To ensure a proper distilling operation, these slits should be so dimensioned and so positioned that sheets of liquid can be formed having a very small thickness of only a few mm and that the distance between adjacent sheets is in the order of magnitude of about 1 to 5 cm.

In alignment with the slits 16 and 17, a plurality of series of substantially V-shaped redistributor gutters 18 and 19, respectively, are arranged below the gutters 12 and 13, said series being vertically spaced apart from one another. These series of V-shaped redistributors, intended for redistributing the downflowing liquid during operation of the vessel, are suitably arranged at distances of about 5 to 50 cm above one another. The redistributor gutters 18 and 19 may be formed of fine mazed screens curved or bent into the desired V-shape.

For collecting the sheets of cooling liquid, a series of substantially horizontal collecting gutters 20 are arranged in the lower part of the vessel in substantial alignment with the distributor gutters 13 and the redistributor gutters 19. The collecting gutters 20 are provided with open lower ends 21 for discharging liquid into substantially vertically arranged tubes 22 connected to the cooling liquid outlet tube 8, which outlet tube passes through an opening in the curved bottom wall 4. As shown in FIG. 1 the residue outlet tube 9 is arranged in an opening in the lowermost part of the curved bottom wall 4. For the sake of accessibility to the various vessel internals each row of a vertically aligned distributor gutter 12, and redistributor gutters 18 and each row of a vertically aligned distributor gutter 13, redistributor gutters 19 and collecting gutter 20, can be separately removed from the vessel. Thereto each row is supported on a supporting ring 23 secured to the inner surface of vessel side wall 2, and is provided with vertically extending end walls 24 and 25, extending over substantially the full length of the vessel. The redistributor gutters as well as the collecting gutters are secured to said end walls 24 and 25. Finally, a return line 26 with pumping means 27 and cooling means 28 is provided for recirculating part of the formed distillate to the inlet tube 7.

The operation of the vessel 1 for distilling heavy liquid, such as short residue from a conventional high vacuum unit is as follows. The liquid to be distilled is supplied from a source through a heating unit 29, wherein the temperature of the liquid is raised, for example to 450° C. The liquid may subsequently be pumped through a degassing chamber not shown, in which it is relieved of dissolved gas and any highly volatile hydrocarbons which it may have contained. The heated, degassed, liquid is then passed into the upper or distributing part of vessel 1 via the inlet tube 6, while the pressure in the vessel is maintained at a very low level by pumping means of not shown connected to the tubular member 5. The liquid to be distilled is discharged from the inlet tube 6 into the gutters 12 via the openings 10 in the lower part of said tube 6. By regulating the rate of pumping a constant head of liquid may be maintained in these gutters 12, while the liquid is fed through the slits 16 in a plurality of fine curtains of falling liquid to the distilling part of the vessel 1.

Simultaneously with the supply of liquid to be distilled a cooling liquid is fed to the vessel 1 via the inlet tube 7 and passes via the openings 11 in the lower part of said inlet tube 7 into the gutters for cooling liquid 13. Via the slits 17 the cooling liquid enters into the actual distilling part of the vessel 1 in the form of a plurality of fine curtains of falling cooling liquid. The curtains of hot liquid to be distilled and cold cooling liquid are disposed in the distilling part of the vessel alternately with respect to one another. During its passage downwardly through the intermediate part of the vessel a portion of the hot liquid is vaporized. The formed vapors leave the thin curtains of hot liquid and pass through the vessel, come into contact with the curtains of cold cooling liquid adjacent to the hot liquid curtains and subsequently condense on said cold liquid curtains, thereby forming liquid distillate.

During the process care must be taken that the hot liquid curtains and the cold liquid curtains do not intermix with one another, in order to prevent contamination of the formed distillate. The redistributor gutters 12 and 13 serve to remove possible irregularities from the falling liquid and correct the shape of the liquid curtains.

Since the most volatile constituents in the hot liquid are the first to vaporize and leave the hot liquid curtains, the most volatile distillate is formed on the upper part of the curtains of cooling liquid. Less volatile constituents will be drawn off from the hot liquid in the lower part of the distillation section of the vessel 1.

The remaining non-vaporized liquid in the hot liquid curtains is collected in the bottom part of the vessel 1 and is subsequently discharged via the residue outlet tube 9. The cooling liquid with formed distillate is collected in the collecting gutters 20, and discharged from the vessel 1 via the tubes 22 and subsequently the outlet tube 8. Part of the cooling liquid with formed distillate may be reused for distilling purposes by recirculating this liquid via return line 26. The return line 26 is provided with cooling means 28, in which the recirculated liquid is cooled to such an extent as to form condensation surfaces in the distilling part of the vessel.

It should be noted that the cooling liquid may consist entirely of recirculated distillate formed in the vessel.

Figure 3:
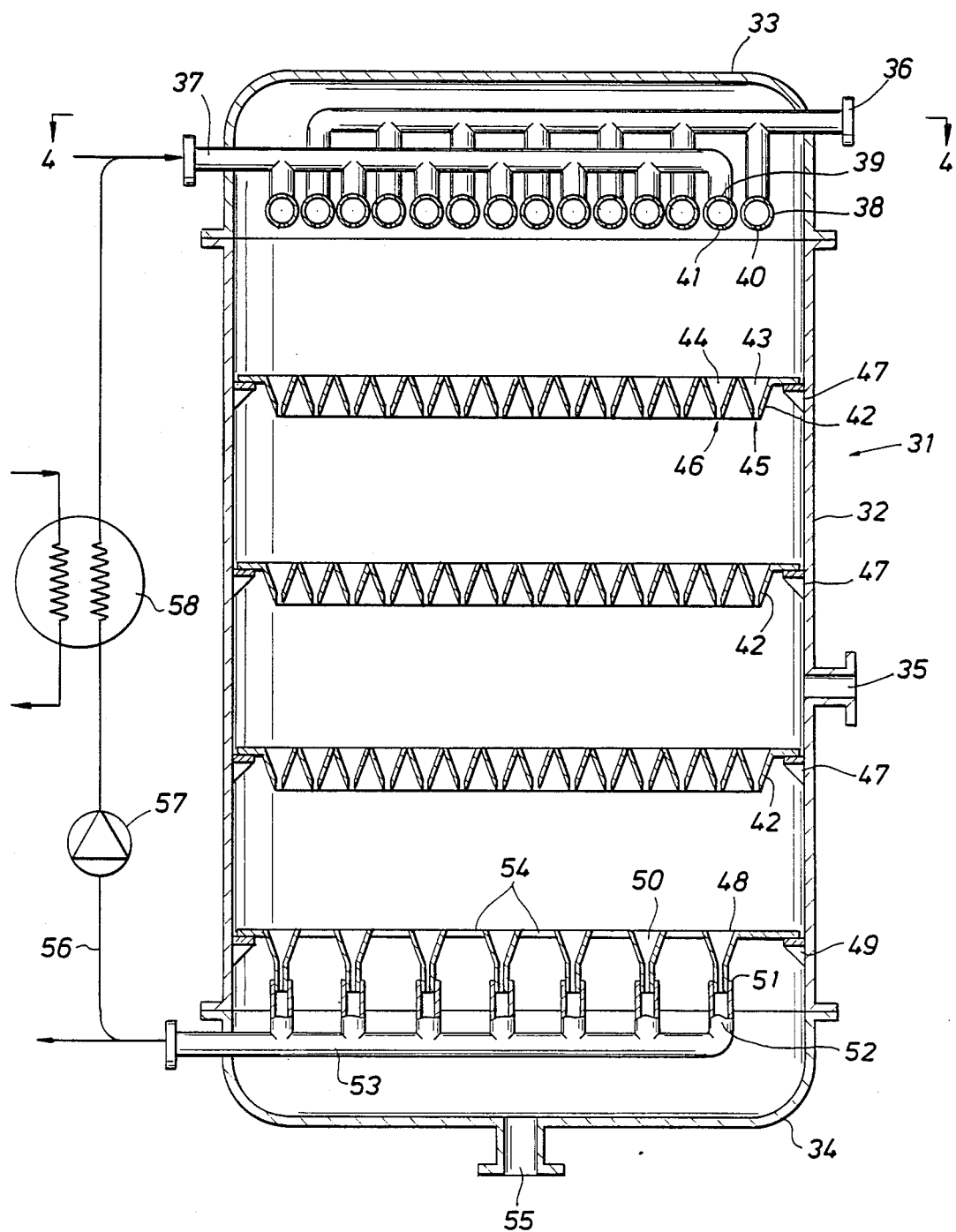
FIG. 3 shows a vertical cross-section of a second apparatus according to the invention.
Figure 4:
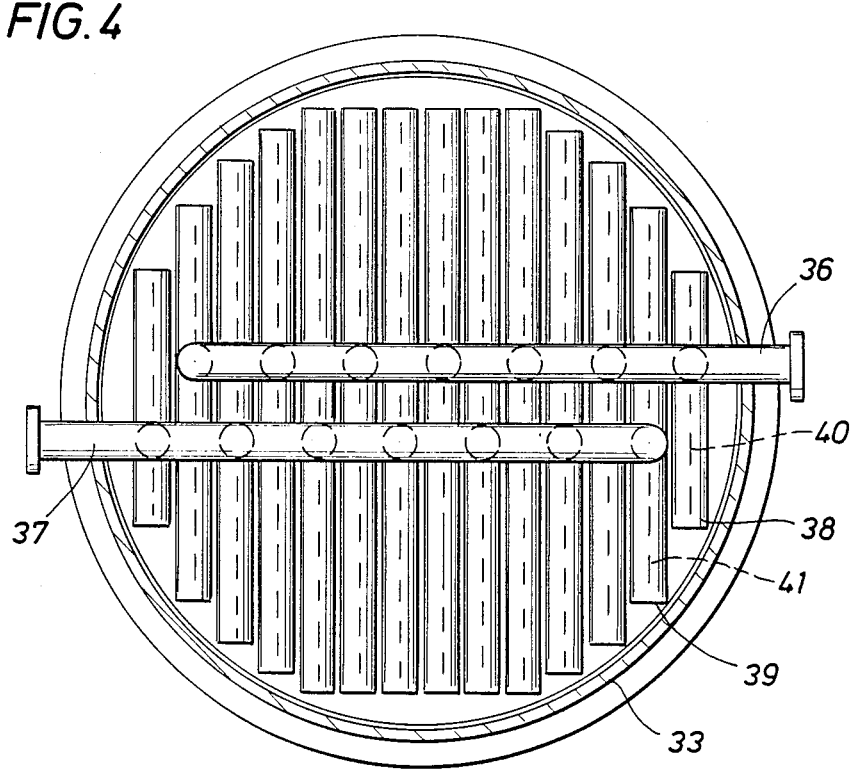
FIG. 4 shows cross-section IV—IV of the apparatus shown in FIG. 3.

Reference is now made to FIGS. 3 and 4, showing a second embodiment of a vacuum distillation unit according to the invention. FIG. 3 shows a vertically extending vessel 31 having a substantially cylindrical side wall 32, a curved top wall 33 and a curved bottom wall 34. The curved top wall 33 and the curved bottom wall 34 are detachably secured to the vessel side wall 32 by means of flange connections. For depressurizing the interior of the vessel a tubular member 35 is inserted in the side wall 32 of said vessel, which member is connected to not shown pumping means capable of producing a vacuum of below about 1 mm. The vessel is provided with an inlet tube 36 for liquid to be distilled and an inlet tube 37 for cooling liquid, both tubes extending over substantially the full width of the vessel and passing through openings in the curved top wall 33. Each of the inlet tubes 36 and 37 is provided with distributing pipes or channels 38 and 39, respectively, which pipes are substantially uniformly and alternately distributed over the cross-section of the vessel 1. The distributing pipes 38 for liquid to be distilled and the distributing pipes 39 for cooling liquid are provided with a plurality of liquid discharge openings 40 and 41, respectively, in their lower ends. The liquid discharge openings 40 and 41 are formed by substantially circular, small holes in the pipe walls 38 and 39, respectively.

The interior of the vessel 31 is further provided with a plurality of substantially horizontal, vertically spaced apart corrugated trays 42, for redistributing the sheets of liquid to be distilled and the sheets of cooling liquid. Thereto the trays are provided with corrugations 43, 44 substantially aligned with the liquid discharge openings 40, 41 of the distributing pipes 38, 39, which corrugations are provided with small liquid discharge holes 45 and 46, respectively, arranged in their lower ends. The corrugated trays 42 are detachably mounted on support rings 47, secured to the inner surface of the vessel side wall 32. The bottom part of the vessel 31 is provided with a distillate collecting tray 48, supported on a support ring 49 secured to the inner surface of the vessel side wall 32. The collecting tray 48 is provided with a plurality of corrugations 50 being aligned with the corrugations 44 in the redistributor trays 42. The corrugations 50 are provided with liquid discharge openings 51 at their lower ends, which discharge openings are arranged within collecting tubes 52, forming an integral part of a distillate outlet tube 53 passing through an opening in the curved bottom wall 34.

The corrugated collecting tray 48 is further provided with openings 54 arranged as to allow the passage of residue, i.e. the non-vaporized part of the liquid treated in the vessel. An outlet tube 55 for residue passes through an opening in the lower part of the curved bottom wall 34.

As clearly shown in FIG. 3 the inlet tubes 36 and 37 and the outlet tubes 53 and 55 are arranged above and below, respectively, the vessel side wall 32. The advantage of this arrangement consists herein that the vessel can be easily dismantled by removing from the side wall 32, the top wall 33 and thus the tubes 36 and 37, and removing the bottom wall 34 and thus the outlet tubes 53 and 55. The remaining part of the vessel is now fully accessible. The various trays can be removed therefrom by lifting them from their adjoining support rings.

To enable the formed distillate to be recirculated to the vessel in order to serve as cooling liquid a return line 56 with pumping means 57 and cooling means 58 is arranged between the outlet tube 53 and the cooling liquid inlet tube 37.

The operation of this second vessel, shown in FIGS. 3 and 4, for distilling heavy liquid is as follows.

Liquid to be distilled is pumped into the vessel 31 via the inlet tube 36 after having been heated to the required distillation temperature and optionally degassed. In the vessel itself, which is depressurized via pumping means connected with tubular member 35, the liquid to be distilled is distributed over the cross-section of the vessel via the distributing pipes 38. By regulating the rate of pumping a constant pressure is maintained in the distributing pipes 38, while the liquid is fed through the liquid discharge holes 40 in the form of thin jets of liquid to the distilling part of the vessel 31. Simultaneously with the supply of liquid to be distilled a cooling liquid consisting of for example cooled distillate is fed to the vessel's interior via the inlet tube 37 and passes through the liquid discharge holes 41 in the distributing pipes 39, thereby entering into the distilling part of the vessel in the form of a plurality of thin jets of liquid.

In the intermediate part of the vessel a liquid pattern is generated, in which each jet of liquid to be distilled is arranged adjacent to a jet of cooling liquid. The jets of liquid to be distilled and the jets of cooling liquid are grouped in substantially parallel rows, thereby forming substantially vertical sheets, wherein each sheet of jets of liquid to be distilled is arranged in close proximity to at least one sheet of cooling liquid. Upon flowing down through the intermediate part of the vessel 31, a portion of the hot liquid is vaporized by the heat contained in the liquid. The so formed vapors leave the sheets of hot liquid and pass towards a sheet of cooling liquid, onto which the vapors subsequently condense, thereby forming liquid distillate. During their passage downwards the hot liquid and the cooling liquid are redistributed at several locations in the vessel by the corrugated trays 42 in order to maintain proper liquid sheets over the full length of that part of the vessel, in which the actual distillation takes place. The formed distillate is collected in the corrugations 50 of the collecting tray 48 and subsequently withdrawn from the vessel 31 via the collecting tubes 52 and the distillate outlet tube 53. The non-vaporized part of the hot liquid passes through the openings 54 in the collecting tray 48, is collected in the bottom part of the vessel and subsequently withdrawn from the vessel via the outlet 55 in the lower part of the bottom wall 34. Formed distillate may be used for forming the sheets of cooling liquid in the vessel. Thereto part of the formed distillate is recirculated through return line 56 by pumping means 57 and after having been cooled down in cooling means 58, introduced into the vessel 31 via the inlet tube for cooling liquid indicated with reference numeral 37. The recirculated distillate may at will be mixed with fresh cooling fluid supplied via not further shown liquid supply means.

Figure 5:
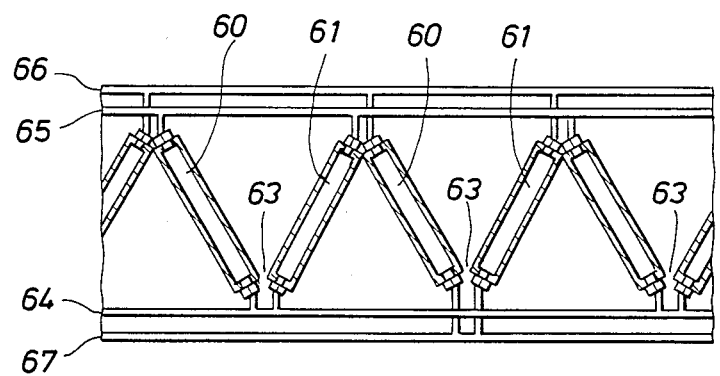
FIG. 5 shows an alternative to the redistributing means on a larger scale than the scale of the previous figures.

Reference is now made to FIG. 5 showing an alternative of the redistributing means shown in the previous FIGS. 1 and 3. This alternative may advantageously be applied in relatively large distillation vessels. These further redistributing means are not only intended for redistributing cooling liquid and liquid to be distilled for maintaining proper liquid sheets, but they also serve to correct the temperature of the cooling fluid and the liquid to be distilled. The redistributing means shown in FIG. 5 comprises a plurality of inclined hollow elements 60 and 61, extending over substantially the whole horizontal cross-section of a not shown distillation vessel having an outer shape identical to for example the outer shape of the vessels shown in the previous FIGS. 1 and 3. The hollow elements 60 and 61 are arranged with respect to one another such that substantially V-shaped gutters are formed with passages 62 and 63 at their lower ends for cooling liquid and hot liquid to be distilled, respectively. The passages 62 and 63 are alternately arranged with one another. The hollow elements forming gutters with passages 62 for cooling liquid are connected with a supply line 64 and discharge line 65 for circulating a cooling medium, such as cooling water, through said elements. The hollow elements forming gutters with passages 63 for liquid to be distilled are connected with a supply line 66 and discharge line 67 for circulating a heating medium, such as superheated steam, through said elements.

During operation of a vessel provided with redistributing means as shown in FIG. 5, the liquid passing through the passages 62/63 is not only redistributed to form proper sheets of cooling liquid and liquid to be distilled but is also cooled and heated respectively to maintain proper distillation temperatures throughout substantially the whole length of the distillation vessel.

Although the distillation vessels shown in the Figures are provided with single outlets for distillate, it should be noted that these vessels may also be provided with a plurality of vertically spaced apart outlets for recovering distillates with different constituencies. The intermediate removal of distillate should, however, be so carried out that proper sheets of cooling liquid are maintained throughout the vessel. Thereto it may be necessary to attend intermediate removal of distillate with intermediate addition of fresh cooling liquid.

Further, it should be noted that the invention is not restricted to a distillation unit provided with liquid redistributing means. If the vessel is rather small the redistributing means can be even deleted.

Finally, it is remarked that the thin sheets of liquid do not need to extend substantially parallel to one another, as generated with the distillation vessels shown. Instead thereof, the distributing means may be for example so arranged that substantially concentric cylinders of thin sheets of liquid to be distilled and thin sheets of cooling liquid are formed during operation of the relevant vessel.

What is claimed is:

1. A process for the fractional distillation of a liquid under vacuum comprising:
   preheating a liquid to be distilled;
   forming under vacuum a first series of thin sheets of free falling preheated liquid which are allowed to fall in an unsupported and unguided manner;
   forming under vacuum a second series of thin sheets of free falling cooling liquid which are allowed to fall in an unsupported and unguided manner;
   arranging said first and second series of thin sheets in alternate positions in close proximity to one another;
   vaporizing a portion of the preheated liquid of the first series of thin sheets;
   passing the vaporized portion to the second series of thin sheets of cooling liquid, to form liquid distillate;
   collecting the thin sheets of cooling liquid and the thin sheets of preheated liquid to be distilled and passing the collected thin sheets through liquid redistributing means to form new thin sheets of free falling preheated and cooling liquids; and
   separately recovering the liquid distillate with the cooling liquid and the non-vaporized portion of the preheated liquid.

2. Process as claimed in claim 1 wherein the thin sheets of preheated liquid to be distilled are caused to pass through liquid heating means.

3. Process as claimed in claim 1 wherein the thin sheets of cooling liquid are caused to pass through liquid cooling means.

4. Process as claimed in claim 1 wherein each sheet of liquid of the first series is spaced apart from a sheet of liquid of the second series at a distance of at most 5 cm.

5. Process as claimed in claim 4 wherein each sheet of liquid of the first series is spaced apart from a sheet of liquid of the second series at a distance of at least 1 cm.

6. Process as claimed in claim 1 wherein the cooling liquid is comprised at least partly of cooled distillate formed in a previous stage of the process.

* * * * *